Figure 1:
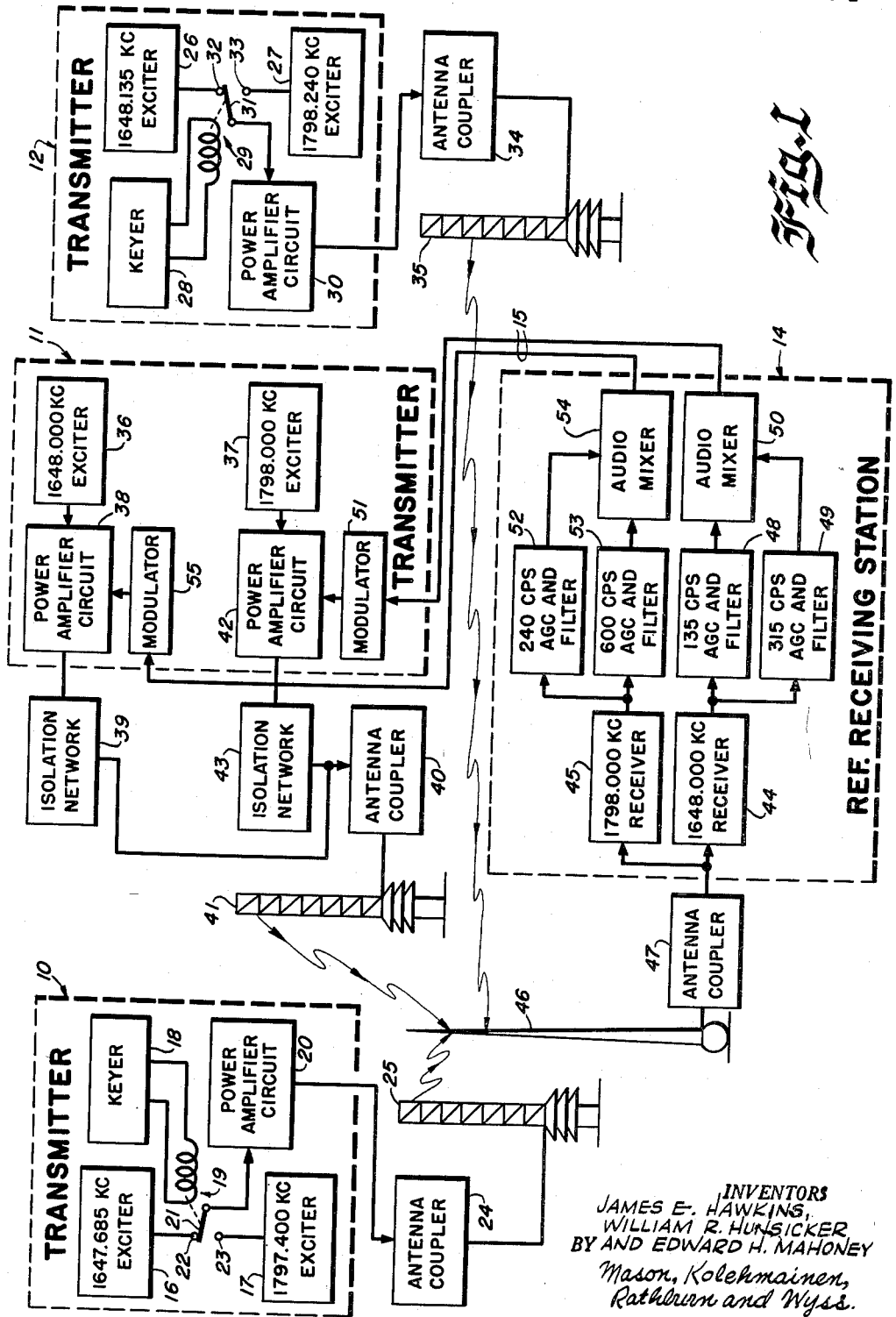

March 27, 1962

J. E. HAWKINS ETAL 3,027,555

APPARATUS FOR RETRIEVING LOST LANES IN
HYPERBOLIC POSITION FINDING SYSTEMS

Filed July 13, 1960

2 Sheets-Sheet 1

INVENTORS
JAMES E. HAWKINS,
WILLIAM R. HUNSICKER,
BY AND EDWARD H. MAHONEY

Mason, Kolehmainen,
Rathburn and Wyss.
ATTORNEYS.

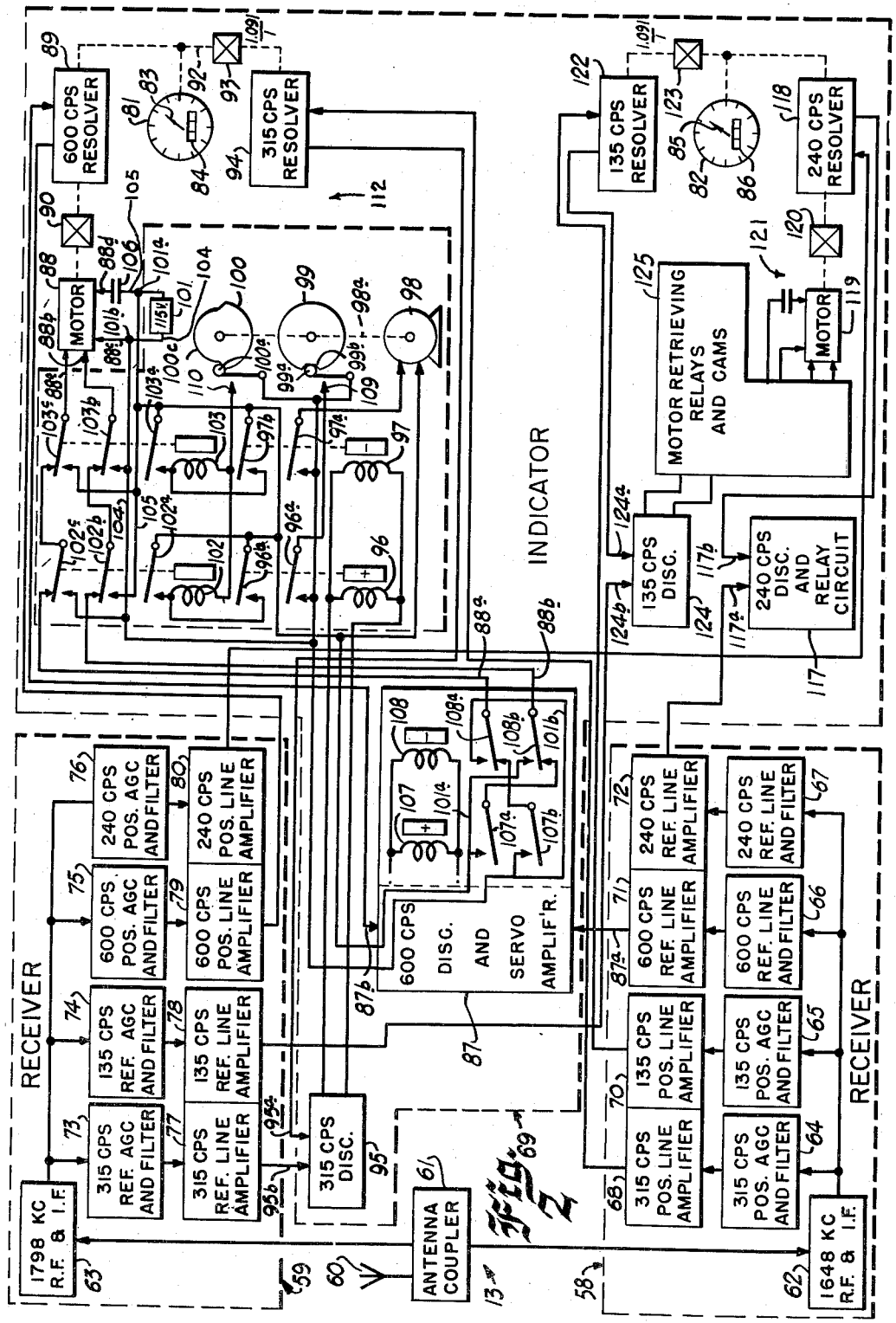

United States Patent Office 3,027,555
Patented Mar. 27, 1962

3,027,555
APPARATUS FOR RETRIEVING LOST LANES IN HYPERBOLIC POSITION FINDING SYSTEMS
James E. Hawkins, Broken Arrow, and William R. Hunsicker and Edward H. Mahoney, Tulsa, Okla., assignors to Seismograph Service Corporation, Tulsa, Okla., a corporation of Delaware
Filed July 13, 1960, Ser. No. 42,638
41 Claims. (Cl. 343—105)

The present invention relates generally to radio position determining systems and is more particularly concerned with improvements in radio position finding systems of the hyperbolic continuous wave type employing phase comparison in pairs of position indicating signals radiated from a plurality of spaced transmitting points to provide one or more indications from which the position of a mobile receiving point relative to the known locations of the transmitters may be determined very accurately. The invention is particularly concerned with a new and improved system of the above type which is provided with apparatus for retrieving lane identification which may be lost as a result of system failures in the receiving or transmitting equipment or by weak signal areas caused by local conditions adversely affecting radio wave propagation.

In systems of the particular type referred to, the continuous waves radiated from each pair of transmitters bear a phase relationship at the mobile receiving unit which changes as a function of the changing position of the latter unit relative to the transmitting points. More specifically, the waves radiated by each pair of transmitting units of the system are characterized by isophase lines which are hyperbolic in contour about the transmitting points as foci. With this system arrangement, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced transmitters, different pairs of which function to provide a grid-like pattern of intersecting hyperbolic isophase lines in order to obtain a position fix providing an absolute determination of the position of the receiving point.

In Honore Patent No. 2,148,267 a system is disclosed in which the waves radiated from each pair of transmitters are heterodyned at a fixed linked transmitting point and the difference frequency between the heterodyned waves is modulated as a reference signal on the carrier wave output of the link transmitter for radiation to the receiving point where the difference frequency component is detected and phase compared with the difference frequency signal derived by directly heterodyning the transmitted continuous waves arriving at the receiving point from the pair of transmitters. In this manner any phase shifts between the continuous waves radiated from the two transmitters are completely compensated so that the measured phase angle is truly representative of the location at the receiving point between the pair of isophase lines. In Hawkins Patent No. 2,513,316 an improved system is disclosed wherein a single reference transmitter is employed as a link transmitter for radiating all of the reference signals to the mobile receiving point, thereby reducing the number of signal channels required as well as the amount of equipment necessary to provide a complete system.

A particular problem encountered in the operation of continuous wave systems of the type disclosed in the Honore and Hawkins patents is that of eliminating ambiguity from the phase measurements which provide the desired position information. Thus, while the two phase measurements identify the position of the receiving station relative to two intersecting pair of hyperbolic isophase lines, they do not identify the particular pair of lines to which the indications are related. This means that in operating the system, the geographic location of the receiving point must be known at the start of movement of the receiver relative to the transmitting stations and furthermore that the successive wavelengths or lanes traversed must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

One means employed heretofore for identifying the lanes or grids has been to provide an integrating counter mechanism which adds or subtracts a digit when the phase indicator undergoes a change of 360 degrees. Since a lane is crossed whenever such a 360 degree change occurs, the lanes are continuously identified by the integrating counter while the phase indicator provides information concerning the precise position of the multiple receiver within the lane identified. A system of this type, however, requires continuous uninterrupted operation of the transmitting and receiving facilities since even relatively short periods of interrupted operation may result in the loss of one or more counts on the integrating counters if the mobile receiving unit moves during the period of interruption. Such interruptions might be caused by failure of the indicating, receiving or transmitting equipment for short periods of time or, in the alternative, by the presence of a weak signal area in the field pattern of the transmitting system. The presence of a weak signal area, which might be caused by local conditions adversely affecting radio wave propagation, renders the receiver insensitive to phase changes and, hence, the mobile unit may pass through a lane without at the same time adding or subtracting a digit from the counting mechanism. As soon as the signal strength returns to normal or when the system is restored to normal operation the phase indicator again provides accurate information concerning the location of the mobile craft but the integrating counters have, in the meantime, failed to record the lane change and as a result the actual position of the receiver cannot be determined. It would, of course, be desirable to provide a system which operates automatically at the completion of the interruption period to drive the integrating counters until the latter again provide an accurate lane count and the satisfaction of this desire therefore constitutes one of the principal objects of the present invention.

A further object of the present invention is to provide apparatus for retrieving lost lanes in a hyperbolic continuous wave radio position finding system.

Another object of the present invention is to provide a new and improved transmitting system for use in radio position finding systems of the type described above.

The invention has for a further object the provision of new and improved mobile receiving equipment for use in radio position finding systems of the type described above and including apparatus for automatically driving the integrating counters to indicate accurately the proper lane count at the termination of any interruption in the normal operation of the system.

The invention, both as to its organization and manner of operation, together with further objects and advantages will best be understood by reference to the following description taken in conjunction with the accompanying drawings wherein:

FIG. 1 is a diagrammatic representation of a three foci transmitting system characterized by the features of the present invention; and FIG. 2 is a diagrammatic representation of a mobile receiving unit for use with the transmitting system shown in FIG. 1 to provide a determination of the position of a mobile craft operating within the field pattern of the transmitting system.

Referring now to the drawings and more particularly to FIG. 1 thereof, the invention is there illustrated as embodied in a three foot hyperbolic, continuous wave system for providing position information at any number of mobile receiving units 13 (FIG. 2) which may be carried on vessels or vehicles operating within the transmission field of a plurality of spaced apart transmitters or transmitting units 10, 11 and 12. These transmitters are preferably spaced apart approximately equal distances and are so positioned that an imaginary base line joining the points of location of the units 10 and 11 is angularly related to a similar base line joining the points of location of the units 11 and 12. As a consequence, the transmitter or transmitting unit 11 may be considered to be the center transmitter while the transmitters 10 and 12 may be referred to as the end transmitters.

As is described more fully hereinafter each of the end transmitters 10 and 12 is equipped to radiate alternately a pair of position indicating signals in the form of continuous radio frequency waves. The center transmitter 11 is equipped to radiate continuously a pair of position indicating signals each of which may at certain times be modulated with reference signals developed at reference receiving station 14. The latter station is located at or near the center transmitter 11 and is connected to the latter preferably through a cable 15. While the particular frequencies of the signals radiated from the transmitters 10, 11 and 12 are unimportant insofar as the principles of operation of the system are concerned, specific frequencies have been assigned in order to simplify the explanation.

Briefly considered, the equipment provided at the end transmitter 10 comprises a first wave generating oscillator or exciter 16 for developing a first radio frequency signal, for example, a wave having a frequency of 1647.685 kilocycles. The end transmitter 10 further includes a second wave generating oscillator or exciter 17 for developing a second radio frequency signal which is displaced considerably in frequency from the signal developed by the exciter 16. The separation between these two frequency bands is selected to provide the desired degree of resolution. For example, the exciter 17 may develop an output signal of 1797.400 kilocycles. A switching or keyer circuit 18 including a relay 19 alternately connects the outputs of the exciters 16 and 17 to a single power amplifier circuit 20. This switching circuit 18 runs freely and preferably makes several switching operations per second. When the relay 19 is effective to move its pole 21 into engagement with the fixed contact 22 the output of the exciter 16 is applied to the power amplifier circuit while movement of the pole 21 into engagement with the contact 23 results in application of the output of the exciter 17 to the power amplifier. The output of the power amplifier 20 is applied through an antenna coupler circuit 24 of conventional construction for radiation from a single radiating antenna 25.

The equipment provided at the end transmitter 12 is almost identical to that at the end transmitter 10 except that the frequencies of the signals developed by the exciters are slightly different. More specifically, wave generators or exciters 26 and 27 at the unit 12 are illustrated as developing signals having frequencies of 1648.135 and 1798.240 kilocycles respectively. The output signals from these exciters are alternately applied to a single power amplifier circuit 30 through a relay 29 actuated by a keyer 28. The output of the power amplifier 30 is applied through an antenna coupler 34 to a single radiating antenna 35. To effect the alternate supply of signals from the exciters 26 and 27 to the power amplifier 30, the keyer circuit 28 alternately moves the pole 31 of the relay 29 into engagement with fixed contacts 32 and 33. This keyer circuit is not synchronized with the keyer circuit 18 at the end transmitter 10 and, as a consequence, the switching operations taking place at the two end transmitters occur at random and are independent of each other.

It should be observed that the switching taking place at the end transmitters 10 and 12 permits the use of a single power amplifier and radiating antenna at each end station for transmitting alternately the two signals developed by the pair of exciters. The system will also perform satisfactorily by the use of two separate, continuously operating transmitters at each end station but the equipment required for such operation is much more complex and considerably more expensive than that illustrated in FIG. 1. In addition, it might also be possible to apply the output of the two exciters at each end station through a linear mixer and power amplifier circuit of the type described and claimed in United States Patent No. 2,872,676 granted to William R. Hunsicker and assigned to the same assignee as the present invention. However, such a linear power amplifier is very expensive to construct since the circuit voltage capabilities thereof must be twice that of the power amplifier used at the end transmitters in a time sharing arrangement of the type shown in FIG. 1. more specifically, in a linear mixing amplifier the circuitry must be able to withstand voltages equal to twice the peak output of one of a conventional amplifier since at least during certain brief instants the two signals supplied from the pair of exciters to the linear power amplifier circuit will be so phased that the amplifier circuitry will be subjected to a voltage of twice the peak amplitude of a conventional amplifier. Therefore, the transmitting arrangement illustrated in FIG. 1 is considerably simpler and less expensive than either of the alternative arrangements suggested, although insofar as system operation is concerned, both of the alternative arrangements will perform satisfactorily.

The equipment provided at the center transmitter 11 includes a pair of wave generators or exciters 36 and 37 which are illustrated as respectively developing signals having frequencies of 1648.000 and 1798.000 kilocycles. The signal output of the exciter 36 is applied through a power amplifier circuit 38, through an isolation network 39 and through an antenna coupler circuit 40 to a radiating antenna 41. The output of the exciter 37, on the other hand, is applied through a power amplifier circuit 42, through an isolation network 43 and through the antenna coupler 40 to the radiating antenna 41. The isolation networks 39 and 43 prevent interaction between the signals from the power amplifiers 38 and 42 and, hence, avoid undesired spurious emissions from the antenna 41. The exciters 36 and 37 both function continuously and as a consequence the radiating antenna 41 is effective to emanate continuously two radio frequency signals at the indicated frequencies.

The reference receiving station 14 includes a pair of conventional continuous wave receivers 44 and 45 the signal input circuits of which are excited by signals passed from a receiving antenna 46 through an antenna coupler circuit 47. The tuning circuits of the receiver 44 are adjusted to accept all signals in the vicinity of 1648.000 kilocycles and, as a consequence, this receiver accepts the signal developed by the exciter 16 at the end transmitter 10, the signal developed by the exciter 26 at the end transmitter 12 and the signal developed by the exciter 36 at the center transmitter 11. The tuning circuits of the receiver 44 are sufficiently selective to reject the signal developed by the exciter 17 at the end transmitter 10, the signal developed by the exciter 27 at the end transmitter 12 and the signal developed by the exciter 37 at the center transmitting unit. The receiver 44 heterodynes in pairs the three signals which it accepts and develops at its output terminals a 315 cycle difference signal resulting from heterodyning the signals generated by the exciters 16 and 36, a 135 cycle difference signal resulting from the heterodyning of the signals generated by the exciters 26 and 36 and a 450 cycle difference signal developed as a result of heterodyning the signals produced by the exciters 16 and 26. All of these signals are applied to the input terminals of a pair of combined band pass filter and automatic gain control circuits 48 and 49 connected to the output of the receiver 44. The filter and AGC circuit 48 is tuned to pass the 135 cycle difference signal but rejects the other two difference signals while the filter and AGC circuit 49 passes the 315 cycle difference signal and rejects the remaining components. Thus, it will be observed that both of the filters 48 and 49 reject the 450 cycle signal developed from heterodyning the signals from exciters 16 and 26 and, hence, this particular signal has no effect on the operation of the transmitting system. The signals from the filters 48 and 49 are applied to a linear audio mixer 50 the output of which is connected through the cable 15 to a conventional amplitude modulator circuit 51 at the center transmitter. The audio mixer 50 does not heterodyne the low frequency signals supplied thereto since it is a linear mixer circuit. The audio signal or signals applied to the modulator 51 is amplitude modulated upon the radio frequency wave developed by the exciter 37 and, as a consequence, under certain conditions as described more fully hereinafter the output signal supplied to the isolation network 43 comprises an amplitude modulated continuous wave.

The tuning circuits of the receiver 45 are adjusted to accept signals in the vicinity of 1798.000 kilocycles and, as a consequence, the signals developed by the exciters 17, 27 and 37 are passed through the RF tuning circuits of this receiver. These tuning circuits are, of course, sufficiently selected to reject the signals developed by the oscillators 16, 26 and 36. However, the three signals accepted by the receiver 45 are heterodyned in pairs so that three different heterodyne signals may possibly be developed at the receiver output. The first such heterodyne signal is a 600 cycle difference signal resulting from heterodyning the signals developed by the exciters 17 and 37 while the second such signal is a 240 cycle difference signal resulting from heterodyning the signals developed by the exciters 27 and 37 and the third such signal is an 840 cycle difference signal developed by heterodyning the signals produced by the exciters 17 and 27. The signal output from the receiver 45 is applied to a pair of band pass filter and automatic gain control (AGC) circuits 52 and 53. The band pass filter and AGC circuit 52 is tuned to pass the 240 cycle difference signal appearing at the output of the receiver 45 but rejects the remaining components while the band pass filter and AGC circuit 53 is tuned to pass the 600 cycle difference signal at the output of the receiver 45 while rejecting the remaining components. Thus, the 840 cycle signal developed from heterodyning the signals from the exciters 17 and 27 is rejected by both of the filters 52 and 53 and has no effect on the operation of the system. The signals passed by the two band pass filters and AGC circuits 52 and 53 are applied to a linear audio mixer 54 which is effective to pass these signals through the cable 15 to an amplitude modulator circuit 55 at the center transmitting unit 11. Here again, the low frequency signals supplied to the audio mixer 54 are not heterodyned since the latter circuit is completely linear. The signals passed to the modulator 55 are amplitude modulated upon the carrier wave developed by the exciter 36.

Turning now to the operation of the transmitting portion of the system illustrated in FIG. 1, it will be observed that since the switching taking place at the end transmitters 10 and 12 is not synchronized, four different operating conditions are possible as follows:

(1) The end transmitter 10 may be effective to radiate the signal generated by the exciter 16 while the end transmitter 12 is effective to radiate the signal generated by the exciter 26. Under these conditions, the receiver 44 develops all three of the above described heterodyned components and the band pass filter and AGC circuits 48 and 49 pass the 135 cycle and 315 cycle signals through the audio mixer 50 to the modulator 51. Thus, the 1798.000 kilocycle wave developed by the exciter 37 is simultaneously modulated with 135 and 315 cycle reference signals which as will be described hereinafter are used for lane identification purposes. Under this condition of operation, the signal developed by the exciter 36 is not modulated. The 135 and 315 cycle modulation components appearing on the 1798.000 kilocycle wave radiated from the center transmitting unit are reproduced by the receiver 45 but, since they are both rejected by each of the filter and AGC circuits 52 and 53, they do not affect the operation of the reference receiver.

(2) The end transmitter 10 may be effective to radiate the signal generated by the exciter 16 while the end transmitter 12 is effective to radiate the signal generated by the exciter 27. Under these conditions, the receiver 44 heterodynes the signals from the exciters 16 and 36 to develop a 315 cycle heterodyne signal which is passed through the filter and AGC circuit 49, through the mixer 50 and through the cable 15 to the modulator 51 where it is modulated upon the carrier wave generated by the exciter 37. At the same time, the receiver 45 is effective to heterodyne the signals from the exciters 27 and 37 to develop a 240 cycle difference frequency signal which is passed through the band pass filter and AGC circuit 52 through the audio mixer circuit 54 and through the cable 15 to the modulator 55 where it is modulated upon the carrier wave generated by the exciter 36. Thus, under these conditions the center transmitter radiates two carrier waves one of which is modulated by the 240 cycle reference signal and the other of which is modulated by the 315 cycle reference signal. The 240 cycle modulation component is reproduced by the receiver 44 at the reference receiving station but it is rejected by both of the filters 48 and 49. Similarly, the 315 cycle modulation component appearing upon the 1798.000 kilocycle wave radiated from the center transmitting unit 11 is reproduced by the receiver 45 but it too is rejected by both of the filters 52 and 53.

(3) The end transmitter 10 may be effective to radiate the signal generated by the exciter 17 while the end transmitter 12 is effective to radiate the signal generated by the exciter 26. Under these conditions the receiver 44 heterodynes the signals from the exciters 26 and 36 and produces the 135 cycle difference frequency signal which is passed through the filter 48 through the audio mixer 50 and through the cable 15 to the modulator 51 where it is amplitude modulated upon the carrier wave developed by the exciter 37. At the same time the receiver 45 heterodynes the signals generated by the exciters 17 and 37 and develops 600 cycle difference frequency signal therebetween which is passed through the filter 53 through the audio mixer 54 and through the cable 15 to the modulator 55 where it is amplitude modulated upon the carrier wave developed by the exciter 36. Thus under these conditions the 1648.000 kilocycle signal radiated from the center transmitter is amplitude modulated with the 600 cycle signal passed by the filter 53 while the 1798.000 kilocycle signal radiated from the center transmitting unit 11 is amplitude modulated with the 135 cycle signal passed by the filter 48. Here again the amplitude modulation components are reproduced by the receivers 44 and 45 but are rejected by the band pass filters at the outputs of these receivers.

(4) The end transmitter 10 may be effective to radiate the signal generated by the exciter 17 while the end transmitter 12 is effective to radiate the signal generated by the exciter 27. Under these conditions the receiver 45 develops all three heterodyne or difference frequency signals. The 240 cycle difference signal developed from heterodyning the signals from the exciters 27 and 37 and is passed through the filter and AGC circuit 52 to the mixer 54 simultaneously with the 600 cycle difference signal developed by the receiver 45 as a result of heterodyning the signals from exciters 17 and 37 and passed through the filter and AGC circuit 53. As was previously indicated the audio mixer 54 does not heterodyne the 240 and 600 cycle signals applied to its two sets of input terminals but instead passes both of these signals through the cable 15 to the modulator 55 where they are simultaneously modulated upon the 1648.000 kilocycle carrier wave developed by the exciter 36. Under these conditions no signals are applied to the modulator 51 and, hence, the 1798.000 kilocycle signal developed by the exciter 37 is radiated as a pure or unmodulated wave. The 240 and 600 cycle reference signals modulated upon the 1648.000 kilocycle wave radiated from the unit 11 are reproduced by the receiver 44 but rejected by both of the filters 48 and 49.

In view of the foregoing description it will be observed that any one of the four described conditions may exist at any given instant since the switching rates of the keying circuits 18 and 28 at the end transmitters are not synchronized. However, these switching rates are sufficiently rapid to provide for continuous operation since the switching is preferably affected several times per second at each end station.

Turning now to the equipment provided at the mobile receiving unit 13, it will be observed that all of the signals radiated from the end stations 10 and 12 and from the center station 11 are received by a single receiving antenna 60 and are applied through an antenna coupler circuit 61 to a pair of conventional radio frequency receivers 58 and 59. The receiver 58 includes an RF-IF circuit strip 62 tuned to accept frequencies in the vicinity of 1648.000 kilocycles developed by the exciters 16, 26 and 36 and is sufficiently selective to reject the signals developed by the exciters 17, 27 and 37. The circuit 62 reproduces the 240 and 600 cycle reference signals modulated upon the 1648.000 kilocycle signal radiated from the center transmitter 11 and, in addition, this circuit heterodynes the three accepted waves in pairs to develop the three heterodyne or difference frequency signals therebetween. The output of the receiver 62 is applied to four combined AGC and filter networks 64, 65, 66 and 67 tuned to different frequencies. The network 64 passes the 315 cycle difference frequency signal developed as a result of heterodyning the signals from the exciters 16 and 36 through an amplifier 68 to an indicator unit 69 which will be described more fully hereinafter. Similarly the network 65 is tuned to pass the 135 cycle difference signal developed as a result of heterodyning the signals from the exciters 26 and 36 through an amplifier 70 to the indicator unit 69. The network 66 is tuned to pass the 600 cycle reference signal reproduced from the modulation component appearing on the 1648.000 kilocycle wave received from the center transmitter 11. This 600 cycle reference signal is passed from the network 66 through an amplifier 71 to the indicator 69. In similar manner the network 67 is tuned to pass the 240 cycle reference signal reproduced from the modulation component on the 1648.000 kilocycle wave received from the center transmitter 11. The 240 cycle signal passed by the filter 67 is applied through an amplifier 72 to the indicator unit 69. Each of the filter networks 64, 65, 66 and 67 is, of course, sufficiently selective to pass only one of the signals developed at the output of the receiver 62 and to reject all others.

Similarly, the receiver 59 includes tuned RF and IF circuits represented by the block 63 in FIG. 2 which are adjusted to accept those signals in the vicinity of 1798.000 kilocycles developed by the exciters 17, 27 and 37 and to reject the signals developed by the exciters 16, 26 and 36. The three signals accepted by the circuit 63 are heterodyned in pairs to develop the difference frequency signals therebetween and, in addition, the circuit 63 reproduces the 135 cycle and 315 cycle modulation components appearing upon the 1798.000 kilocycle signal radiated from the center transmitter 11. The signals developed at the output of the circuit 63 are applied to four combined band pass filter and automatic gain control circuits 73, 74, 75 and 76 which are tuned to different frequencies. The latter circuits separate the output signals and supply them through individual amplifiers to the indicator 69. Thus, the filter 73 is tuned to pass the 315 cycle reference signal through an amplifier 77, the circuit 74 passes the 135 cycle reference signal through an amplifier 78, the circuit 75 passes the 600 cycle difference frequency signal resulting from heterodyning the signal developed by the exciters 17 and 37 through an amplifier 79 and finally the circuit 76 passes the 240 cycle difference frequency signal resulting from heterodyning the signal developed by the oscillators 27 and 37 through an amplifier 80. The amplifiers 68, 70, 71, 72, 77, 78, 79 and 80 are constructed and arranged to match the output impedances of the filter circuits to the input impedances of the indicator unit 69. The indicator unit 69 utilizes the signals supplied from the amplifiers to provide on an indicating device 81 a first fine position indication representative of the location of the mobile receiving unit relative to closely spaced, hyperbolic, isophase lines having foci at the transmitting units 10 and 11 and to provide a second fine position indication on an indicating device 82 representing the position of the mobile receiving unit relative to closely spaced, hyperbolic, isophase lines having foci at the transmitting units 11 and 12. The hyperbolic lines to which the indicating device 81 pertains have a spacing which is a function of the frequency of the signals from the exciters 17 and 37 and, for convenience, this family of hyperbolic lines is hereafter referred to as the "Red" family. The indicating device 81 includes a pointer 83 cooperating with a dial face or scale to provide continuous readings from 0° to 360°. One complete revolution of the pointer 83 during movement of the mobile craft indicates that a lane has been crossed. The lanes of the Red family are spaced apart along the base line between the stations 10 and 11 by a distance equal to one half length of the frequency of the wave developed by the exciter 37 and, since the lanes diverge on both sides of the base line, a greater distance must be traversed in other areas to cause a complete rotation of the pointer 83. Similarly, the hyperbolic lines to which the indicating device 82 pertains have a spacing which is a function of the frequency of the signals from the exciters 27 and 37 and this family of lines is hereinafter called the "Green" family. Here again the device 82 has a pointer 85 cooperating with a scale to provide readings between 0° to 360°. The Green lanes which are traversed when the pointer 85 makes a complete revolution are spaced apart along the base line between stations 11 and 12 by a distance equal to one half the frequency of the wave developed by the exciter 37.

The pointer 83 of the indicator 81 is connected through mechanism not illustrated in FIG. 2 to drive a set of integrating counters 84 while the pointer 85 of the indicator 82 is similarly connected to drive a set of counters 86. The counters 84 register the number of complete 360° rotations of the pointer 83 and hence provide a count or indication of the Red lane within which the mobile receiving unit is located. In a similar manner the counter 86 registers or records the number of complete 360° revolutions of the pointer 85 and, hence, provides an indication of the Green lane within which the mobile receiving unit is located. Thus, in operation, the mobile receiving unit enters the field of radiation of the transmitting units 10, 11 and 12 at a known geographic location and the indicators 81, 82 including the counters 84 and 86 are initially set through a manual adjusting mechanism not illustrated in the drawings until their readings correspond to the known geographic location. These indicators thereafter change in response to the received signal to provide information identifying the exact location of the mobile receiving unit. More specifically, the position of the pointer 83 with respect to the face of the indicator 81 identifies the exact location of the mobile craft along a hyperbolic isophase line having foci at the transmitting units 10 and 11 while the position of the pointer 85 identifies a second hyperbolic line having foci at the transmitting units 11 and 12. The intersection of these hyperbolic lines of course provides a position fix. The counters 84 and 86 identify the particular lanes to which the fine position indications pertain and, as a consequence, all of the necessary information is available for providing an exact position determination.

The indicators 81 and 82 are driven through a circuit which is generally similar to that described and claimed in United States Patent No. 2,551,211 granted to James E. Hawkins and Beverly W. Koeppel and assigned to the same assignee as the present invention. Reference to this patent may be made for a more detailed description of the operation of the individual components of the indicating equipment. Thus, the circuit for driving the indicator 81 includes a phase discriminator and motor drive circuit 87 for controlling the application of drive from a suitable source 101 of A.C. current to a servo motor 88 which has its output shaft connected through suitable reduction gearing 90 to drive the rotor of a control transformer or resolver 89. The rotor of the control transformer 89 is in turn connected to drive the pointer 83 of the indicator 81 through a mechanical drive mechanism represented by the broken line 91 in FIG. 2. One set of signal input terminals 87a of phase discriminator 87 is supplied with the 600 cycle reference signal from the amplifier 71 while the second set of signal input terminals of the phase discriminator is excited by the 600 cycle signal passed by the amplifier 79 through the resolver 89. The phase discriminator operates in conventional manner to compare the 600 cycle signals and to develop a D.C. control signal whenever the compared signals differ in phase. The polarity of the D.C. control signal developed deepnds upon the direction of the deviation. This control signal is utilized in a manner which will be well understood to those skilled in the art to control the direction of drive of the servo motor 88. Specifically, the control signal controls suitable polar relays 107 and 108 included in the circuit 87 so that the connections between the source 101 and the input terminals 88a and 88b of the servo motor are effectively reversed when the control signal changes polarity. Thus, when the control signal is of one polarity, for example, positive, the relay 107 is energized and the terminal 101a of the source is connected through the contacts 107a through a set of normally closed contacts 108b of the relay 108 and through normally closed contacts 102c and 103c of a pair of control relays 102 and 103 to terminal 88a while at the same time terminal 101b of the source is connected through contacts 107b, through a normally closed set of contacts 108a of the relay 108, and through contacts 102b and 103b of the relays 102 and 103 to the terminal 88b. The A.C. voltage appearing across terminals 88a and 88b excites one winding of the servo motor while the other winding connected to terminals 88c and 88d is excited by an A.C. signal supplied from the source 101 through connectors 104 and 105 and through capacitor 106. The latter capacitor introduces a 90° phase shift to produce quadrature components for exciting the two servo motor windings. Thus, the positive control signal developed by the circuit 87 is effective to cause an A.C. signal to be supplied from the source 101 to drive the motor in one direction, for example, in a forward direction. When the control signal is negative the polar relay 108 is energized so that the relays 107 and 108 effectively reverse the connections from the terminals 101a and 101b to the terminals 88a and 88b in a manner which will be obvious from the foregoing description with the result that the servo motor 88 is driven in the opposite direction.

As is described in the above identified Patent No. 2,551,211, the control transformer or resolver 89 includes a rotor winding and a pair of stator windings, the latter being displaced mechanically 90° apart and being excited with excitation signals displaced 90° in phase. The stator windings of the resolver 89 are thus excited by 600 cycle signals which are displaced in phase through a 90° phase shifting network not illustrated in the drawings but forming a part of the resolver circuit. The voltages induced in the rotor winding of the resolver 89 are of constant amplitude but have a phase relationship which depends upon the position of the rotor winding relative to the fixed stator windings. The output voltage from the resolver 89 is of course derived from the rotor winding and is supplied to the second set of signal input terminals 87b of the phase discriminator and motor drive network 87. In the event that the signals supplied to the terminals 87a and 87b are not in phase, the phase discriminator and motor drive network 87 and the associated relays 107 and 108 function in the manner described above to drive the motor 88 in order to rotate the rotor of the resolver 89 in a direction to bring the phase of the signal supplied to the terminals 87b into coincidence with the reference signal supplied to the input terminals 87a so that the D.C. control signal from the circuit 87 is driven towards zero. This arrangement provides a balanced servo loop with the position of the rotor of the resolver 89 and hence the pointer 83 indicating the phase relationship between the reference signal from the amplifier 71 and the heterodyne signal from the amplifier 79. Thus the pointer 83 indicates the position of the mobile receiving unit 13 along one of the lines of the Red family while the revolution counter 84 indicates the number of lanes that have been crossed by the mobile receiving unit since departing from the starting point and hence identifies the particular line represented by the position of the pointer 83.

As thus far described the indicating equipment is similar to that disclosed in the above identified Patent No. 2,551,211 and hence, as long as the system remains in continuous operation following start of the mobile receiving unit at the known geographic location, the pointer 83 and the revolution counter 84 function continuously to provide the described indications. In the event of equipment failure either at the transmitting stations or in the receivers 58 and 59 at the mobile receiving unit the signal drive to the indicator 69 is, of course, interrupted and, as a consequence, the pointer 83 and the counter 84 will maintain the positions occupied just prior to the interruption. These indications will be maintained despite continued movement of the mobile receiving unit within the radiation field of the transmitters. When the source of trouble has been located and repaired and when the system is restored to normal operation, the 600 cycle reference signal and the 600 cycle position indicating heterodyne signal respectively supplied from the amplifiers 71 and 79 will immediately excite the phase discriminator 87 to drive the motor 88 until the servo loop is balanced, whereupon the pointer 83 provides an accurate indication of the hyperbolic, isophase line of the Red family along which the mobile receiving unit is located. However, if the mobile receiving unit has traversed one or more full lanes of the Red family during the period of interruption of operation the revolution counter 84 no longer provides an accurate lane count.

In accordance with an important feature of the present invention, however, a retrieving circuit indicated generally by the reference numeral 112 is provided for retrieving any lost lane information. This retrieving circuit includes a second resolver or control transformer 94 having its rotor driven from the rotor of the resolver 89 through a mechanical drive 92 including a gear 93. The stator windings of the resolver 94 are similar to those of the resolver 89 since they are displaced mechanically by 90 degrees and are excited by quadrature or 90° phase related components developed from the 315 cycle heterodyne signal passed by the amplifier 68. The signal induced in the rotor winding of the resolver 94 is of constant amplitude but varying phase depending upon the rotor position. This induced signal is applied to one set of signal input terminals 95a of a 315 cycle phase discriminator 95, the second set of signal input terminals 95b of which are excited by the 315 cycle reference signal passed by the amplifier 77. The phase discriminator circuit 95 is similar to the circuit 87 referred to above and provides a D.C. control signal whenever the two signals applied to the signal input terminals 95a and 95b are displaced in phase. Whenever the phase difference between the two input signals exceeds a predetermined value, the control signal from the discriminator 95 becomes sufficient to energize one or the other of a pair of polar relays 96 and 97, the relay 96 being energized when the discriminator signal is positive and the relay 97 being energized when a negative signal is developed. As long as the transmitting and receiving equipment of the system remains in continuous uninterrupted operation the rotor of the resolver 94 is driven from the rotor of the resolver 89 with the two rates of drive of these two rotors being determined by the gear ratio of gearing 93. During such continuous operation any slight difference in phase between the 315 cycle reference signal and the 315 cycle heterodyne signal will be ineffective to develop a control signal at the output of the discriminator 95 of sufficient amplitude to energize either of the relays 96 or 97. However, as will be described more fully hereinafter, if the mobile craft traverses one or more lanes of the Red family during any period of interruption, the retrieving circuit develops a control signal of sufficient amplitude to energize one of the polar relays. If the control signal is of positive polarity, thus indicating, for example, that the counters 84 are indicating too low and, hence, must be driven in a positive direction to add lane counts, the relay 96 is energized to close its two sets of contacts 96a and 96b. The relay 97 is energized only by a negative signal from the circuit 95 and, hence, it remains deenergized to keep its contacts 97a and 97b open. The closing of contact 96a completes a circuit from the A.C. source 101 to a timing motor 98 which thus begins to turn its output shaft 98a in order to rotate a pair of cams 99 and 100 mounted thereon. The closing of contact 96b completes a circuit from the source 101 to the forward control relay 102, thus closing its three sets of contacts 102a, 102b and 102c. The contact 102a is a holding contact for locking the coil of the relay 102 across the A.C. line thus preventing deenergization of the polar relay 96 from breaking the circuit to the relay 102 for a purpose which will become apparent as the description proceeds. The closing of contacts 102b and 102c transfers control of the servo motor from the discriminator circuit 87 to the circuit 95 since an A.C. signal is supplied from the source 101 to terminals 88a and 88b of the servo motor 88 through the normally closed contacts 103b and 103c of the reverse control relay 103, which is, at this time, deenergized. The relays 102 and 103 function in the manner of the relays 107 and 108 previously described to control the direction of rotation of the servo motor by effectively reversing the connections between the terminals 101a and 101b of the source 101 and the terminals 88a and 88b of the servo motor. More specifically, when the relay 102 is energized, the relay 103 will be de-energized so that the servo motor 88 rotates its output shaft in the forward direction described above to advance or increase the reading on the counters 84. Conversely, when the reverse control relay 103 is energized, that is, when the output signal from the discriminator circuit is negative and of sufficient amplitude to energize the polar relay 97 in order to complete a circuit from the source 101 through contacts 97b to the operating coil of the relay 103, the forward control relay will, of course, be deenergized so that the terminals 88a and 88b are connected to the source 101 the contacts 103b and 103c of the energized relay 103 and through the normally closed contacts 102b and 102c of the deenergized relay 102. Thus, under the latter conditions the connections to the terminals 88a and 88b are effectively reversed from those existing when the relay 102 is energized and, as a consequence, the servo motor 88 turns its output shaft in the reverse direction to decrease the reading on the counters 84. As is described more fully below, the control signal is reduced below the predetermined value when the pointer 83 has been rotated through a number of revolutions equal to the number of lost lanes of the Red family, thus adding or subtracting the required number of digits to the counter 84. Thus, the motor 88 remains energized from the source 101 until the pointer 83 reaches a position within 360° of the correct position.

Considering next the manner of operation of the retrieving circuit 112, it will be apparent to those skilled in this art that a direct comparison of the 315 cycle reference signal and the 315 cycle heterodyne signal from the amplifiers 77 and 68 would provide a fine position indication representing the location of the mobile receiving unit 13 relative to closely spaced hyperbolic lines having foci at the transmitting units 10 and 11. This family of hyperbolic isophase lines has the same foci as the Red family referred to above but the spacings between the isophase lines are somewhat different due to the difference in the frequencies employed. Thus, if the mobile receiving unit were moved so as to traverse the isophase lines of both families, it is apparent that the lines of the Red family would be crossed at a somewhat faster rate than those of the family to which the 315 cycle signals pertain. If the resolver 94 and the discriminator 95 were connected in a balanced servo loop like that described above, a position indication would be provided from the 315 cycle heterodyne and reference signals and during movement of the mobile craft the rotor of the resolver 94 would rotate faster than that of the resolver 89, the ratio between these rates of rotation being equal to the ratio between the frequencies. Thus, in order to compensate for the difference in lane width between the two hyperbolic families having foci at the stations 10 and 11, the gearing 93 has a ratio corresponding to that of the frequencies involved and in the particular instance described this ratio is approximately 1.091 to 1 and is a set-up ratio in going from mechanical drive connection 92 to the rotor of the resolver 94. As long as the transmitting and receiving equipment remains in continous operation without an interruption of the type described above, the rotor of the resolver 94 turns somewhat faster than that of the resolver 89 and the signals supplied to the input terminals 95a and 95b of the phase discriminator remain balanced so that neither of the relays 96 or 97 is energized. Therefore, as the rotor of the resolver 89 rotates through 360° when the mobile craft moves through one lane of the Red family, the rotor of the resolver must rotate through 360×1.091 or about 393°. Since the rotor of the resolver 89 is not rotated during any period of interruption in the system operation, it is also apparent that the rotor of the resolver 94 remains stationary during this period. Since the position of the rotor of the resolver 89 is a function solely of the position of the mobile receiving unit with respect to the transmitting units 10 and 11, as soon as the system is restored to normal operation, the rotor of the resolver 89 assumes a position which reflects the position of the mobile receiving unit along one of the hyperbolic isophase lines of the Red family in the manner described above. The rotation of the rotor of the resolver 89 in reaching the correct position following restoration of normal operation is also effective to drive the rotor of the resolver 94. If the mobile receiving unit has not crossed one of the lanes of the Red family during the period of system interruption, the signal suppled to the terminals 95a and 95b of the phase discriminator 95 is immediately balanced and, as a consequence, neither of the polar relays 96 or 97 is energized. Such a condition would indicate that the revolution counter 84 has not lost a lane count during the interruption period. If, however, the mobile receiving unit 13 has crossed one or more lanes of the Red family during the period of system interruption, the movement of the resolver 89 will not bring the phase discriminator 95 into balance. More specifically, since the rotor of the resolver 94 moves 1.0909 degrees for each degree of movement of the rotor of the resolver 89, the resolver 94 is 360×(1.091−1) or 33° out of balance for each lost lane. The sensitivity of the discriminator circuit 95 is such that sufficient drive is developed for energizing one of the relays 96 or 97 whenever the unbalance of the resolver 94 exceeds about 20°. Therefore, if one lane of the Red family has been lost during the interruption period, the resulting 33° unbalance of the resolver 94 will be sufficient to energize one of the relays 96 or 97 in order to drive the motor 88 in a direction to retrieve the lost lane in the manner described above. If the motor 88 must be driven in a forward direction to add a lane count, the error signal from the circuit 95 is positive and the relay 96 is energized thus completing the drive to the timing motor 98 through the contact 96a and also energizing the relay 102 to supply a forward drive signal to the servo motor 88. When the timing motor is energized its cams 99 and 100 begin to turn in a clockwise direction as viewed in FIG. 2 at any suitable rate which for purposes of illustration will be assumed to be one-half revolution per second. The cam 99 moves its associated cam follower 99a out of the neutral position shown in FIG. 2 where it rests within a peripheral notch 99b to a position where it engages a fixed contact 109. The cam follower 99a is spring biased against the periphery of the cam and remains in engagement with the contact 109 until the cam 99 completes a full revolution whereupon the follower 99a again seats within the notch 99b. The contact 109 and the follower 99a complete a circuit to the timing motor 98 in parallel with the relay contacts 96a and 97a and, hence, they prevent the timing motor from being deenergized until the cycle is completed. This is an important feature of the invention since it prevents a false null in the circuit 95 from adversely affecting the circuit operation as will be described more fully below.

When the cam 100 is rotated in from the neutral position shown in FIG. 2, its associated cam follower 100a is moved into engagement with a fixed contact 110, thus completing a circuit to the operating coils of the relays 102 and 103 independently of the relay contacts 96b and 97b. The follower 100a remains in engagement with the contact 110 throughout the period when it rides upon the raised portion 100b of the cam 100 and thereafter descends into the recessed portion 100c of the cam to break the contact 110. The raised portion 100b is shaped and dimensioned to maintain the follower 100a against the contact 110 for a period slightly less than one-half of a complete revolution of the cam 100 or, more specifically, for a period of about 0.9 of a second when the cam is rotated at a rate of one-half revolution per second as described above. The servo motor may be assumed to turn its output shaft at a rate of one revolution per second and, hence, during the period when the contact 110 is closed the servo motor shaft turns through 0.9 of a revolution. At the termination of the 0.9 second period the contact 110 is broken and, if only one lane has been lost, the output from the discriminator 95 is no longer sufficient to maintain the relay 96 energized with the result that the relays 102 and 103 are both deenergized. By this, however, the servo motor has been driven sufficiently to retrieve the lost lane and the control of the servo motor is therefore returned to the discriminator circuit 87 which supplies a signal to position the indicator 83 within the proper lane. The timing motor remains energized for another 1.1 seconds until the cam 99 completes its revolution and if, at this time, both of the relays 96 and 97 are deenergized, a condition which will exist only if the unbalance in the signals applied to the discriminator 95 is less than 20° or less than one lane, the timing motor is then deenergized.

If, instead of adding a lane count as described above, one lane must be subtracted from the counters 84, the output signal from the discriminator is negative and the relay 97 is energized. Energization of the latter relay completes the circuit to the reverse control relay 103 and to the timing motor 98, thus driving the servo motor 88 in the reverse direction. This operation is believed to be obvious from the foregoing discussion, and hence, will not be described in detail.

If more than one lane of the Red family has been crossed during the period of interruption, the relay 96 or 97 (whichever the case may be) will not be deenergized and, as a result, at the completion of the cycle of the timing motor 98, the circuit to this motor will still be completed despite the breaking of the contact 109. Thus, the timing motor will recycle until the proper lane count has been restored on the counters 84.

As was indicated previously, the use of the cams 99 and 100 and the relays 102 and 103 prevents any false null from the discriminator 95 from interrupting the lane retrieving action of the circuit 112. Specifically, when the control of the servo motor has been transferred to the discriminator circuit 95 the servo motor 88 will be driven in a direction to balance or null the signal from this circuit. If one lane has been lost, a balanced condition will be reached as soon as the rotor of the resolver 94 is moved through 33°; if two lanes have been lost the balanced condition exists after 66° of resolver rotation and so on. Obviously, these balanced conditions represent false nulls since the resolver 89 has not been driven much less than one revolution and, hence, the lost lane or lanes have not been retrieved. If the control of the circuit were restored to the discriminator 87 when one of these false nulls was obtained the servo motor 88 would merely drive the indicator back towards the position it occupied before the retrieving circuit 112 came into operation, thus again unbalancing the circuit 95. The indicator would then oscillate between these two balanced conditions and the lost lane or lanes could not be retrieved. This condition is avoided in the circuit disclosed, by maintaining the relays 102 or 103 energized throughout the first part of the retrieving cycle independently of the polar relays 96 and 97. Any false null condition must exist within the first half of the cycle of the timing motor since the unbalance of the discriminator 95 cannot exceed 180°. However, any such false null occurring during this period is not effective to break the circuit to the energized relay 102 or 103 even though it causes the polar relays 96 and 97 to be deenergized. Thus, the circuit to the energized relay 102 or 103 is completed through the cam follower 100a and the contact 110 which remain closed until the rotor of resolver 94 has been driven past the false null position.

After the resolver 89 has been driven until the indicating device 81 is within one lane of the correct reading, the error voltage from the resolver 89 reaches a level where it is no longer sufficient to maintain the relay 96 or 97 energized. The energized relay then returns to its normal or deenergized position whereupon the servo motor 88 is again excited by the output of the discriminator circuit 87. The resolver 89 is driven until the 600 cycle reference and heterodyne signals supplied to the terminals 87a and 87b are balanced whereupon the pointer 81 again provides the fractional lane reading while the counter 84 registers the proper lane count. In view of the foregoing description, it will be observed that the resolver 94 is balanced every eleven lanes. Therefore, the automatic lane correction provided by the retrieving circuit 100 is possible only if the mobile craft does not move more than five and one-half lanes during the interruption period. Any greater movement of the mobile craft would unbalance the resolver 94 to such an extent that the retrieving circuit would correct to a value either eleven lanes too high or eleven lanes too low, depending of course upon the direction of the resolver unbalance.

The operation of the indicator 69 to provide the second position indication representing the location of the mobile craft relative to the Green family of hyperbolic lines will now be obvious. Thus, this portion of the equipment comprises a balanced servo loop including a phase discriminator and relay circuit 117 having input terminals 117a excited by the 240 cycle reference signal from the amplifier 72 and input terminals 117b excited by the 600 cycle heterodyne signal from the rotor winding of a resolver of control transformer 118. The servo loop further includes a servo motor 119 driving the rotor of the resolver 118 through gearing 120 with the rotor of this resolver also being connected to drive the pointer 85 of the indicating device 82. The balanced servo loop functions in a manner which will be apparent in view of the above description to drive the pointer 85 so that the latter provides a fine position indication representing the location of the mobile craft relative to closely spaced, hyperbolic, isophase lines of the Green family having foci at the transmitting units 11 and 12. To retrieve any lanes of the Green family during any of the aforementioned interruption periods, there is provided a retrieving circuit 121 similar to the circuit 112 described above. The circuit 121 includes a resolver 122 having its rotor driven from the rotor of the resolver 118 through a gearing 123 which again has a 1.091 step-up ratio. The stator windings of the resolver 122 are excited by quadrature components of the 135 cycle heterodyne signal from the amplifier 68 with the rotor winding being connected to supply signals induced therein to input terminals 124a of a phase discriminator 124. The latter discriminator compares the phase of the signal supplied to terminals 124a with that of the 135 cycle reference signal supplied to terminals 124b from the amplifier 78 and develops a unidirectional control signal having a polarity which is a function of the direction of any deviation in phase between the input signals and having an amplitude which is a function of the magnitude of any such deviation. A set of relays and cams represented by the block 125 are connected to the output of the discriminator 124 to perform the functions of the polar relays 96 and 97, the timing motor 98 and its cams and the control relays 102 and 103 in exactly the same manner as described above. As long as the system remains in continuous, uninterrupted operation, the retrieving circuit 121 is ineffective to develop a control signal of sufficient amplitude to energize the relays of the circuit 125 and, as a result, the drive to the servo motor 119 is controlled exclusively by the discriminator and relay circuit 117. Following any period of interruption, the retrieving circuit 121 functions in a manner which will be obvious to retrieve any lanes of the Green family traversed during the interruption. This is accomplished by developing a control signal of sufficient amplitude to energize one of the relays of the circuit 125 in order to drive the servo motor 119 as an A.C. motor in a direction to restore the counter 86 to the proper lane count. When the pointer 84 reaches a position within 360° of the correct value, the control signal from the discriminator 124 is no longer sufficient to energize the relays of the circuit 125 and, hence, the servo motor 119 drives this pointer to the correct fractional lane reading in response to signals from the discriminator and relay circuit 117. Here again, the automatic lane correction can be made only if the mobile craft does not move more than five and one-half lanes during any interruption period. However, most causes of system inoperation can be corrected before such a large movement of the mobile craft occurs.

In view of the detailed description of the invention above, the operation of the system shown in FIGS. 1 and 2 is believed to be obvious. It will be apparent that the system described is effective to accomplish all of the enumerated objects of the invention.

While particular embodiments of the invention have been illustrated and described, it will be understood by those skilled in this art that many modifications and changes may be made without departing from the true spirit and scope of the invention as set forth in the appended claims.

What is claimed as new and desired to be secured by Letters Patent of the United States is:

1. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from each station, at least one of the waves of the first group having first modulation components derived from heterodyning the waves of the second group and at least one of the waves of the second group having second modulation components derived from heterodyning the waves of the first group; said equipment comprising first circuit means responsive only to the waves of the first group for reproducing said first modulation components to develop first and second reference signals and for heterodyning the waves of the first group in pairs to develop first and second heterodyne signals; second circuit means responsive only to the waves of the second group for reproducing said second modulation components to develop third and fourth reference signals and for heterodyning the waves of the second group in pairs to develop third and fourth heterodyne signals; first indicating means for comparing the phases of the first reference signal and the third heterodyne signal to provide a first position indication representing the location of the mobile receiving equipment relative to a first pair of the transmitting stations; second indicating means for comparing the phase relationship between the second reference signal and the fourth heterodyne signal to provide a second position indication representing the location of the mobile receiving equipment relative to a second pair of the transmitting stations; each of said indicating means including a phase discriminator responsive to the compared signals for developing a motor drive signal, servo motor means energized by the motor drive signal, a control transformer having a rotor driven by said motor means and a stator winding excited by one of the signals to be compared with said rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, each of said indicating means further including a circuit for retrieving any lanes traversed by the mobile receiving equipment during any periods of system inoperation, the retrieving circuit of each indicating means including a resolver having a rotor driven from the rotor of the control transformer of that indicating means through gearing having a ratio substantially equal to the ratio between the mean frequencies of the two groups of waves, the retrieving circuit of the first indicating means further including a phase comparison circuit for comparing the phases of said third reference signal and said first heterodyne signal with one of the two last named signals being supplied to a stator winding of the resolver in the first indicating means and with the signal induced in the rotor winding of the latter resolver being supplied to said phase comparison circuit, the retrieving circuit of the second indicating means also including a phase comparison circuit for comparing the phases of said fourth reference signal and said second heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a unidirectional control signal having a polarity which is a function of the direction of any deviation in phase between the two signals compared thereby and having an amplitude which is a function of the magnitude of such phase deviation, each of said retrieving circuits including a relay means excited by the control signal developed thereby with said relay means being in operating condition only when the amplitude of the control signal exceeds a predetermined value and with the relay means being capable of establishing at least two different operating conditions one of which is established when the control signal is of positive polarity and the other of which is established when the control signal is negative in polarity, each indicating means including a circuit for supplying a driving signal to its servo means independently of its phase discriminator through the relay means in its retrieving circuit whenever the latter relay means is in one of its operating conditions, thereby to drive the rotors of its control transformer and resolver until the control signal is no longer of sufficient amplitude to maintain the relay means in one of its operating conditions.

2. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals, for heterodyning the waves of the first group in pairs to develop first and second heterodyne signals and for heterodyning the waves of the second group in pairs to develop third and fourth heterodyne signals; first indicating means for comparing the phases of the first reference signal and the first deterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including a phase discriminator responsive to the compared signals for developing a motor drive signal in response to deviation in phase between the compared signals, motor means driven by said motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, each of said indicating means further including a circuit for retrieving any lanes traversed by the mobile receiving equipment during any periods of system inoperation, the retrieving circuit of each indicating means including a resolver having a rotor driven from the rotor of the control transformer of that indicating means through gearing having a ratio substantially equal to the ratio between the mean frequencies of the two groups of waves, the retrieving circuit of the first indicating means further including a phase comparison circuit for comparing the phases of said third reference signal and said third heterodyne signal with one of the two last named signals being supplied to a stator winding of the resolver in the first indicating means and with the signal induced in the rotor winding of the latter resolver being supplied to said phase comparison circuit, the retrieving circuit of the second indicating means also including a phase comparison circuit for comparing the phases of said fourth reference signal and said fourth heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a unidirectional control signal having a polarity which is a function of the direction of any deviation in phase between the two signals compared thereby and having an amplitude which is a function of the magnitude of such phase deviation, and each indicating means including a circuit responsive to said control signal whenever the latter exceeds a predetermined value for supplying a driving signal to its motor means independently of its phase discriminator, thereby to drive the rotors of its control transformer and resolver until the control signal falls below said predetermined value.

3. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals, for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including an indicator for providing the position indication and a counter mechanism driven by said indicator for registering the lanes traversed by the mobile receiving equipment, each of said indicating means further including a circuit for retrieving any lanes traversed by the mobile receiving equipment during any periods of system inoperation, the retrieving circuit of each indicating means including a resolver having a rotor driven with the indicator of that indicating means through gearing having a ratio substantially equal to the ratio between the mean frequencies of the two groups of waves, the retrieving circuit of the first indicating means further including a phase comparison circuit for comparing the phases of said third reference signal and said third heterodyne signal with one of the two last named signals being supplied to a stator winding of the resolver in the first indicating means and with the signal induced in the rotor winding of the latter resolver being supplied to said phase comparison circuit, the retrieving circuit of the second indicating means also including a phase comparison circuit for comparing the phases of said fourth reference signal and said fourth heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a control signal saving an amplitude which is a function of the magnitude of any phase deviation between the compared signals, and each indicating means including a circuit responsive to said control signal whenever the latter exceeds a predetermined value for driving said indicator independently of the phase relationship between the first reference signal and the first heterodyne signal thereby to drive the rotor of the resolver until the control signal falls below said predetermined value.

4. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals, for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including a phase discriminator responsive to the compared signals for developing a motor drive signal in response to deviation in phase between the compared signals, motor means driven by said motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, each of said indicating means further including a circuit for retrieving any lanes traversed by the mobile receiving equipment during any periods of system in operation, the retrieving circuit of each indicating means including a circuit for comparing the phases of said third reference signal and said third heterodyne signal to develop a first control signal and the retrieving circuit of the second indicating means including a circuit for comparing the phases of said fourth reference signal and said fourth heterodyne signal to develop a second control signal, and each indicating means including a circuit responsive to the control signal developed by its retrieving circuit for supplying to its motor means a drive signal whenever the control signal exceeds a predetermined value, thereby to drive its servo motor independently of its phase discriminator.

5. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals, for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including an indicator for providing the position indication and a counter mechanism driven by said indicator for registering the lanes traversed by the mobile receiving equipment, each of said indicating means further including a circuit for retrieving any lanes traversed by the mobile receiving equipment during any periods of system in operation, the retrieving circuit of each indicating means including a device driven from said indicator, the retrieving circuit of the first indicating means further including a phase comparison circuit for comparing the phases of said third reference signal and said third heterodyne signal with one of the two last named signals being supplied to said phase comparison circuit through the device in its retrieving circuit, the retrieving circuit of the second indicating means also including a phase comparison circuit for comparing the phases of said fourth reference signal and said fourth heterodyne signal with one of the two last named signals being supplied to the phase comparison circuit of the second indicating means through the device in the retrieving circuit of the latter indicating means, each of said phase comparison circuits being effective to develop a control signal in response to deviation in phase between the two signals compared thereby and having an amplitude which is a function of the magnitude of such phase deviation, and each indicating means including a circuit responsive to said control signal whenever the latter exceeds a predetermined value for driving its indicator and the device in its retrieving circuit until the control signal falls below said predetermined value.

6. A hyperbolic, continuous wave, radio position finding system comprising three spaced apart transmitting units for radiating first and second groups of waves with each group containing at least three waves of slightly different frequency and with one wave in each group being radiated from each station; means at one of said stations for modulating one of the waves of the first group with a first pair of modulation components derived from heterodyning in pairs the waves of the second group; means for modulating at least one of the waves of the second group with a second pair of modulation components derived from heterodyning in pairs the waves of the first group; and mobile receiving equipment comprising first circuit means responsive only to the waves of the first group for reproducing said first pair of modulation components to develop first and second reference signals and for heterodyning the waves of the first group in pairs to develop first and second heterodyne signals; said receiving equipment also including second circuit means responsive only to the waves of the second group for reproducing said second pair of modulation components to develop third and fourth reference signals and for heterodyning the waves of the second group in pairs to develop third and fourth heterodyne signals; first indicating means in the receiving equipment for comparing the phases of the first reference signal and the third heterodyne signal to provide a first position indication representing the location of the mobile receiving equipment relative to a first pair of the transmitting stations; second indicating means in the receiving equipment for comparing the phase relationship between the second reference signal and the fourth heterodyne signal to provide a second position indication representing the location of the mobile receiving equipment relative to a second pair of the transmitting stations; each of said indicating means including a phase discriminator responsive to the compared signals for developing a motor drive signal in response to phase deviations between the compared signals, motor means driven by the motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, each of said indicating means further including a circuit for retrieving any lanes traversed by the mobile receiving equipment during any periods of system inoperation, the retrieving circuit of each indicating means including a resolver having a rotor driven from the rotor of the control transformer of that indicating means through gearing having a ratio substantially equal to the ratio between the mean frequencies of the two groups of waves, the retrieving circuit of the first indicating means further including a phase comparison circuit for comparing the phases of said third reference signal and said first heterodyne signal with one of the two last named signals being supplied to a stator winding of the resolver in the first indicating means and with the signal induced in the rotor winding of the latter resolver being supplied to said phase comparison circuit, the retrieving circuit of the second indicating means also including a phase comparison circuit for comparing the phases of said fourth reference signal and said second heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a unidirectional control signal having a polarity which is a function of the direction of any deviation in phase between the two signals compared thereby and having an amplitude which is a function of the magnitude of such phase deviation, each of said retrieving circuits including relay means excited by the control signal developed thereby with said relay means being in an operating condition only when the amplitude of the control signal exceeds a predetermined value and with the relay means being capable of establishing at least two different operating conditions one of which is established when the control signal is of positive polarity and the other of which is established when the control signal is negative in polarity, each indicating means including a circuit for supplying a driving signal to its motor means independently of its phase discriminator through the relay means in its retrieving circuit whenever the latter relay means is in an operating condition, thereby to drive the rotors of its control transformer and resolver until the control signal is no longer of sufficient amplitude to maintain the relay means in an operating condition.

7. A hyperbolic, continuous wave, radio position finding system comprising three spaced apart transmitting units for radiating first and second groups of waves with each group containing at least three waves of slightly different frequency and with one wave in each group being radiated from each station; means at one of said stations for modulating one of the waves of the first group with a first pair of modulation components derived from heterodyning in pairs the waves of the second group; means for modulating at least one of the waves of the second group with a second pair of modulation components derived from heterodyning in pairs the waves of the first group; and mobile receiving equipment comprising first circuit means responsive only to the waves of the first group for reproducing said first pair of modulation components to develop first and second reference signals and for heterodyning the waves of the first group in pairs to develop first and second heterodyn signals; said receiving equipment including second circuit means responsive only to the waves of the second group for reproducing said second pair of modulation components to develop third and fourth reference signals and for heterodyning the waves of the second group in pairs to develop third and fourth heterodyne signals; first indicating means in the receiving equipment for comparing the phases of the first reference signal and the third heterodyne signal to provide a first position indication representing the location of the mobile receiving equipment relative to a first pair of the transmitting stations; second indicating means in the receiving equipment for comparing the phase relationship between the second reference signal and the fourth heterodyne signal to provide a second position indication representing the location of the mobile receiving equipment relative to a second pair of the transmitting stations; each of said indicating means including an indicator for providing the position indication and a counter mechanism driven by said indicator for registering the lanes traversed by the mobile receiving equipment, each of said indicating means further including a circuit for retrieving any lanes traversed by the mobile receiving equipment during any periods of system in operation, the retrieving circuit of each indicating means including a resolver having a rotor driven from the indicator of that indicating means through gearing having a ratio substantially equal to the ratio between the mean frequencies of the two groups of waves, the retrieving circuit of the first indicating means further including a phase comparison circuit for comparing the phases of said third reference signal and said first heterodyne signal with one of the two last named signals being supplied to a stator winding of the resolver in the first indicating means and with the signal induced in the rotor winding of the latter resolver being supplied to said phase comparison circuit, the retrieving circuit of the second indicating means also including a phase comparison circuit for comparing the phases of said fourth reference signal and said second heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a control signal in response to deviation in phase between the two signals compared thereby, each indicating means including a circuit for driving its indicator and its resolver rotor whenever its control signal exceeds a predetermined value.

8. A hyperbolic, continuous wave, radio position finding system comprising three spaced apart transmitting units for radiating first and second groups of waves with each group containing at least three waves of slightly different frequency and with one wave in each group being radiated from each station; means at one of said stations for modulating one of the waves of the first group with a first pair of modulation components derived from heterodyning in pairs the waves of the second group; means for modulating at least one of the waves of the second group with a second pair of modulation components derived from heterodyning in pairs the waves of the first group; and mobile receiving equipment comprising first circuit means responsive only to the waves of the first group for reproducing said first pair of modulation components to develop first and second reference signals and for heterodyning the waves of the first group in pairs to develop first and second heterodyne signals; said receiving equipment also including second circuit means responsive only to the waves of the second group for reproducing said second pair of modulation components to develop third and fourth reference signals and for heterodyning the waves of the second group in pairs to develop third and fourth heterodyne signals; first indicating means for comparing the phases of the first reference signal and the third heterodyne signal to provide a first position indication representing the location of the mobile receiving equipment relative to a first pair of the transmitting stations; second indicating means for comparing the phase relationship between the second reference signal and the fourth heterodyne signal to provide a second position indication representing the location of the mobile receiving equipment relative to a second pair of the transmitting stations; each of said indicating means including an indicator driven from said rotor for providing the position indication and a counter mechanism driven by said indicator for registering the lanes traversed by the mobile receiving equipment, each of said indicating means further including a circuit for retrieving any lanes traversed by the mobile receiving equipment during any periods of system inoperation, the retrieving circuit of the first indicating means including a first phase comparison circuit for comparing the phases of said third reference signal and said first heterodyne signal to develop a first control signal, the retrieving circuit of the second indicating means including a second phase comparison circuit for comparing the phases of said fourth reference signal and said second heterodyne signal to develop a second control signal, each indicating means including a circuit responsive to the control signal developed thereby for driving the indicator therein whenever the latter control signal exceeds a predetermined value.

9. Mobile receiving equipment for use in hyperbolic, continuous wave, radio position finding systems to provide position indications in response to first and second pairs of waves respectively received from first and second spaced apart transmitting stations and also in response to first and second reference signals modulated upon at least one carrier wave with the first reference signal being derived from heterodyning a first wave of the first pair with a first wave of the second pair and with the second reference signal being derived from heterodyning a second wave of the first pair with a second wave of the second pair; said equipment comprising receiving means for reproducing said first and second reference signals, for heterodyning the first wave of the first pair with the first wave of the second pair to develop a first heterodyne signal and for heterodyning the second wave of the first pair and the second wave of the second pair to develop a second heterodyne signal; indicating means for comparing the phases of the first reference signal and the first heterodyne signal to provide a first position indication representing the location of the mobile receiving equipment relative to the transmitting stations; said indicating means including a phase discriminator responsive to the compared signals for developing a motor drive signal, servo motor means driven by the motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, said indicating means further including a circuit for retrieving any lanes traversed by the mobile receiving equipment during any periods of system inoperation, the retrieving circuit including a resolver having a rotor driven from the rotor of the control transformer through gearing having a ratio substantially equal to the ratio between the mean frequencies of the first and second pairs of waves, the retrieving circuit further including a phase comparison circuit for comparing the phases of said second reference signal and the second heterodyne signal with one of the two last named signals being supplied to a stator winding of the resolver and with the signal induced in the rotor winding of the latter resolver being supplied to said phase comparison circuit, said phase comparison circuit being effective to develop a unidirectional control signal having a polarity which is a function of the direction of any deviation in phase between the two signals compared thereby and having an amplitude which is a function of the magnitude of such phase deviation, and a circuit responsive to the latter control signal when it exceeds a predetermined value for supplying a driving signal to the servo motor means independently of the phase discriminator thereby to drive the rotors of the control transformer and the resolver until the control signal from the phase comparison circuit falls below said predetermined value.

10. Mobile receiving equipment for use in hyperbolic, continuous wave, radio position finding systems to provide position indications in response to first and second pairs of waves respectively received from first and second spaced apart transmitting stations and also in response to first and second reference signals modulated upon at least one carrier wave with the first reference signal being derived from heterodyning a first wave of the first pair with a first wave of the second pair and with the second reference signal being derived from heterodyning a second wave of the first pair with a second wave of the second pair; said equipment comprising receiving means for reproducing said first and second reference signals, for heterodyning the first wave of the first pair with the first wave of the second pair to develop a first heterodyne signal and for heterodyning the second wave of the first pair and the second wave of the second pair to develop a second heterodyne signal; indicating means for comparing the phases of the first reference signal and the first heterodyne signal to provide a first position indication representing the location of the mobile receiving equipment relative to the transmitting stations; said indicating means including an indicator for providing the position indication and a counter mechanism driven by said indicator for registering the lanes traversed by the mobile receiving equipment, said indicating means further including a circuit for retrieving any lanes traversed by the mobile receiving equipment during any periods of system inoperation, the retrieving circuit including a resolver having a rotor driven from the indicator through gearing having a ratio substantially equal to the ratio between the mean frequencies of the first and second pairs of waves, the retrieving circuit further including a phase comparison circuit for comparing the phases of said second reference signal and the second heterodyne signal with one of the two last named signals being supplied to a stator winding of the resolver and with the signal induced in the rotor winding of the latter resolver being supplied to said phase comparison circuit, said phase comparison circuit being effective to develop a control signal having an amplitude which is a function of the magnitude of any phase deviation between the compared signals, and a circuit responsive to the latter control signal when it exceeds a predetermined value for driving said indicator independently of the phase relationship between the first reference signal and the first heterodyne signal until the control signal from the phase comparison circuit falls below said predetermined value.

11. Mobile receiving equipment for use in hyperbolic, continuous wave, radio position finding systems to provide position indications in response to first and second pairs of waves respectively received from first and second spaced apart transmitting stations and also in response to first and second reference signals modulated upon at least one carrier wave with the first reference signal being derived from heterodyning a first wave of the first pair with a first wave of the second pair and with the second reference signal being derived from heterodyning a second wave of the first pair with a second wave of the second pair; said equipment comprising receiving means for reproducing said first and second reference signals, for heterodyning the first wave of the first pair with the first wave of the second pair to develop a first heterodyne signal and for heterodyning the second wave of the first pair and the second wave of the second pair to develop a second heterodyne signal; indicating means for comparing the phases of the first reference signal and the first heterodyne signal to provide a first position indication representing the location of the mobile receiving equipment relative to the transmitting stations; said indicating means including a phase discriminator responsive to the compared signals for developing a motor drive signal, servo motor means driven by the motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, said indicating means further including a circuit for retrieving any lanes traversed by the mobile receiving equipment during any periods of system inoperation, the retrieving circuit including a circuit for comparing the phases of said second reference signal and the second heterodyne signal and for developing therefrom a control signal having an amplitude which is a function of the magnitude of any phase deviation between the compared signals, and a circuit responsive to the latter control signal when it exceeds a predetermined value for supplying a driving signal to the servo motor means independently of the phase discriminator thereby to drive the rotor of the control transformer and the indicator.

12. Mobile receiving equipment for use in hyperbolic, continuous wave, radio position finding systems to provide position indications in response to first and second pairs of waves respectively received from first and second spaced apart transmitting stations and also in response to first and second reference signals modulated upon at least one carrier wave with the first reference signal being derived from heterodyning a first wave of the first pair with a first wave of the second pair and with the second reference signal being derived from heterodyning a second wave of the first pair and with a second wave of the second pair; said equipment comprising receiving means for reproducing said first and second reference signals, for heterodyning the first wave of the first pair with the first wave of the second pair to develop a first heterodyne signal and for heterodyning the second wave of the first pair and the second wave of the second pair to develop a second heterodyne signal; indicating means for comparing the phases of the first reference signal and the first heterodyne signal to provide a first position indication representing the location of the mobile receiving equipment relative to the transmitting stations; said indicating means including an indicator for providing the position indication and a counter mechanism driven by said indicator for registering the lanes traversed by the mobile receiving equipment, said indicating means further including a circuit for retrieving any lanes traversed by the mobile receiving equipment during any periods of system inoperation, the retrieving circuit including means responsive to said second reference signal and said second heterodyne signal when the system is restored to operation for developing a control signal, and means effective when said control signal exceeds a predetermined value for driving said counter mechanism independently of the phase relationship between the first reference signal and the first heterodyne signal.

13. Transmitting apparatus for use in radio position finding systems of the hyperbolic continuous wave type said apparatus comprising first, second and third spaced apart transmitting units; the first said transmitting unit including means for radiating continuously first and second carrier waves having distinguishable frequencies; each of said second and third transmitting units including means for developing two position indicating signals, a radiating circuit having therein a single power amplifier and a single radiating antenna, and switching means for rendering said radiating circuit effective to radiate alternately the two position indicating signals, the switching means at the second and third transmitting units being independent of each other so that the alternate radiation of signals from the second and third units is random and is not synchronized; a first of the two position indicating signals radiated from the second transmitting unit having a frequency differing from that of said first carrier wave by a first relatively small difference and the second of the position indicating signals radiated from the second transmitting unit having a frequency differing from that of the second carrier wave by a second relatively small difference; a first of the position indicating signals radiated from the third transmitting unit having a frequency differing from that of the first carrier wave by a third relatively small difference which is different from said first and second differences and the second position indicating signal radiated from said third transmitting unit having a frequency differing from that of said second carrier wave by a fourth relatively small difference which is different from all of the other three differences; a first receiving means for heterodyning in pairs said first carrier wave, the first position indicating signal radiated from the second unit and the first position indicating signal radiated from the third unit and for developing therefrom said first and third differences; means for modulating said second carrier wave with first and second reference signals respectively derived from the first and third differences developed by the first receiving means; second receiving means for heterodyning in pairs said second carrier wave, the second position indicating signal radiated by the second unit and the second position indicating signal radiated by the third unit and for developing therefrom said second and fourth differences; and means for modulating said first carrier wave with third and fourth reference signals respectively derived from the second and fourth differences developed by the second receiving means.

14. Transmitting apparatus for use in radio position finding systems of the hyperbolic continuous wave type said apparatus comprising first, second and third spaced apart transmitting units; the first said transmitting unit including means for radiating continuously first and second carrier waves having distinguishable frequencies; each of said second and third transmitting units including means for developing two position indicating signals and means for alternately radiating these two indicating signals with the alternate radiation of signals from said second and third units being independent of each other and not synchronized; a first of the two position indicating signals radiated from the second transmitting unit having a frequency differing from that of said first carrier wave by a first relatively small difference and the second of the position indicating signals radiated from the second transmitting unit having a frequency differing from that of the second carrier wave by a second relatively small difference; a first of the position indicating signals radiated from the third transmitting unit having a frequency differing from that of the first carrier wave by a third relatively small difference which is different from said first and second differences and the second position indicating signal radiated from said third transmitting unit having a frequency differing from that of said second carrier wave by a fourth relatively small difference which is different from all of the other three differences; a first receiving means for heterodyning in pairs said first carrier wave, the first position indicating signal radiated from the second unit and the first position indicating signal radiated from the third unit and for developing therefrom said first and third differences; means for modulating said second carrier wave with first and second reference signals respectively derived from the first and third differences developed by the first receiving means; second receiving means for heterodyning in pairs said second carrier wave, the second position indicating signal radiated by the second unit and the second position indicating signal radiated by the third unit and for developing therefrom said second and fourth differences; and means for modulating said first carrier wave with third and fourth reference signals respectively derived from the second and fourth differences developed by the second receiving means.

15. Mobile receiving equipment for use in a hyperbolic, continuous wave, radio position finding system for providing position indications in response to signals received from at least three spaced apart transmitting stations, said equipment comprising means including first and second indicators each movable repeatedly through a predetermined range of movement for respectively providing a first position indication representing the location of said mobile receiving equipment along a first hyperbolic, isophase line of a family of such lines all having foci at a first pair of said stations and a second position indication representing the location of the mobile receiving unit along a second hyperbolic, isophase line of a family of lines having foci at a second pair of the transmitting stations, the first and second lines intersecting at the position of the mobile receiving unit and each of said family of lines being divided into a plurality of lanes with each lane being represented by movement of the corresponding indicator through its predetermined range, means driven in synchronism with each of said indicators for counting the number of repeated movements thereof through its range in order to count the number of lanes of each family traversed by the mobile receiving equipment, and means operated automatically in the event of inoperation of said transmitting stations or said receiving equipment for driving each of said counting means as soon as the inoperation no longer exists through a number of counts corresponding to the number of lanes of each family traversed by said mobile receiving equipment during the period of inoperation.

16. Mobile receiving equipment for use in a hyperbolic, continuous wave, radio position finding system for providing a position indication in response to signals received from at least two spaced apart transmitting stations, said equipment comprising means including an indicator movable repeatedly through a predetermined range of movement for providing a position indication representing the location of said mobile receiving equipment along one hyperbolic, isophase line of a family of such lines all having foci at said stations, said family of lines being divided into a plurality of lanes with each lane being represented by one movement of the indicator through said predetermined range, means driven in synchronism with said indicator for counting the number of repeated movements of said indicator through said range in order to count the number of lanes traversed by the mobile receiving equipment, and means operated automatically in the event of inoperation of said transmitting stations or said receiving equipment for driving said counting means as soon as the inoperation no longer exists through a number of counts corresponding to the number of lanes traversed by said mobile receiving equipment during the period of inoperation.

17. Mobile receiving equipment for use in a hyperbolic, continuous wave, radio position finding system for providing a position indication in response to signals received from at least two spaced apart transmitting stations, said equipment comprising means for comparing the phase relationship between the received signals to provide a position indication representing the location of said mobile receiving equipment along one hyperbolic, isophase line of a family of such lines all having foci at said stations, said family of lines being divided into a plurality of lanes with each lane being represented by a 360° change in the phase relationship between the signals compared by the comparing means, means driven in synchronism with said comparing means for counting the number of lanes traversed by the mobile receiving equipment, and means operated automatically in the event of inoperation of said transmitting stations or said receiving equipment for driving the counting means as soon as the inoperation no longer exists through a number of counts corresponding to the number of lanes traversed by said mobile receiving equipment during the period of inoperation.

18. Equipment for use in a transmitting and receiving system of the hyperbolic, continuous wave, radio position finding system to provide an indication of the position of a mobile craft, said equipment comprising means for comparing the phase relationship between signals received from the transmitting portion of the system to provide a position indication representing the location of said mobile craft along one hyperbolic, isophase line of a family of such lines all having common foci, said family of lines being divided into a plurality of lanes with each lane being represented by a 360° change in the phase relationship between the signals compared by the comparing means, means driven in synchronism with said comparing means for counting the number of lanes traversed by the mobile craft, and means operated automatically in the event of inoperation of said transmitting stations or said receiving equipment for driving the counting means as soon as the inoperation no longer exists through a number of counts corresponding to the number of lanes traversed by said mobile receiving equipment during the period of inoperation.

19. Equipment for use in a hyperbolic, continuous wave, radio position finding system to provide an indication of the position of a mobile craft, said equipment comprising means including an indicator movable repeatedly through a predetermined range of movement for providing a position indication representing the location of said mobile craft along one hyperbolic, isophase line of a family of such lines all having common foci, said family of lines being divided into a plurality of lanes with each lane being represented by one movement of the indicator through said predetermined range, means driven in synchronism with said indicator for counting the number of repeated movements of said indicator through said range in order to count the number of lanes traversed by the mobile craft, and means operated automatically in the event of temporary inoperation in said system for driving said counting means as soon as the inoperation no longer exists through a number of counts corresponding to the number of lanes traversed by said mobile craft during the period of inoperation.

20. A hyperbolic, continuous wave, radio position finding system comprising first and second transmitting stations for radiating first and second pairs of signals with one signal of each pair being radiated from each station, means in said system for heterodyning the signals of each pair to develop first and second difference signals and for transmitting first and second reference signals respectively derived from the first and second difference signals as modulation components upon at least one carrier wave, and mobile receiving equipment including means for reproducing said first and second reference signals and for heterodyning each pair of signals to develop first and second heterodyne signals, means in the receiving equipment for comparing the phase relationship between the first reference signal and the first heterodyne signal to provide a position indication representing the location of said mobile receiving equipment along one hyperbolic, isophase line of a family of such lines all having foci at said transmitting stations, said family of lines being divided into a plurality of lanes with each lane being represented by a 360° change in the phase relationship between the signals compared by the comparing means, means for counting the number of lanes of each family traversed by the mobile receiving equipment, and means operated automatically in response to said second reference signal and said second heterodyne signal in the event of temporary inoperation in the system for driving said counting means as soon as the inoperation no longer exists through a number of counts corresponding to the number of lanes traversed by said mobile receiving equipment during the period of inoperation.

21. A hyperbolic, continuous wave, radio position finding system comprising at least three spaced apart transmitting stations for radiating first and second groups of signals with one signal of each group being radiated from each station, means in said system for heterodyning in pairs the signals of each group to develop four difference signals and for transmitting four reference signals respectively derived from the four difference signals as modulation components upon at least one carrier wave, and mobile receiving equipment including means for reproducing said four reference signals and for heterodyning in pairs each group of signals to develop four heterodyne signals, first indicating means responsive to a first of the reference signals and a first of the heterodyne signals and including an indicator movable repeatedly through a predetermined range of movement for providing a first position indication representing the location of said mobile receiving equipment along one hyperbolic, isophase line of a first family of such lines all having foci at a first pair of said transmitting stations, second indicating means responsive to a second of the reference signals and to a second of the heterodyne signals and also including an indicator movable repeatedly through a predetermined range of movement for providing a second position indication representing the location of the mobile receiving equipment along a hyperbolic, isophase line of a second family of lines having foci at a second pair of said transmitting stations, each of said families being divided into a plurality of lanes with each lane being represented by one movement of the corresponding indicator through its predetermined range, means driven in synchronism with each indicator for counting the number of repeated movements thereof through its range in order to count the number of lanes of each family traversed by the mobile receiving equipment, means operated automatically in response to a third of the reference signals and to a third of the heterodyne signals in the event of inoperation of said system for driving the counting means of the first indicating means as soon as the inoperation no longer exists through a number of counts corresponding to the number of lanes of the first family traversed by said mobile receiving equipment during the period of inoperation, and means similar to the last named means but responsive to a fourth of the reference signals and to a fourth of the heterodyne signals as soon as the inoperation no longer exists for driving the counting means of the second indicating means through a number of counts corresponding to the number of lanes of the second family traversed by the mobile receiving equipment during the period of inoperation.

22. A hyperbolic, continuous wave, radio position finding system comprising at least three spaced apart transmitting stations for radiating first and second groups of signals with one signal of each group being radiated from each station, means in said system for heterodyning in pairs the signals of each group to develop four difference signals and for transmitting four reference signals respectively derived from the four difference signals as modulation components upon at least one carrier wave, and mobile receiving equipment including means for reproducing said four reference signals and for heterodyning in pairs the signals of each group to develop four heterodyne signals, first indicating means responsive to the phase relationship between a first of the reference signals and to a first of the heterodyne signals to provide a first position indication representing the location of said mobile receiving equipment along one hyperbolic, isophase line of a first family of such lines all having foci at said transmitting stations, second indicating means responsive to the phase relationship between a second of the heterodyne signals and a second of the reference signals to provide a second position indication representing the location of the mobile receiving equipment along a hyperbolic, isophase line of a second family of lines having foci at a second pair of the transmitting stations, each of said families being divided into a plurality of lanes with each lane being represented by a 360° change in the phase relationship between the signals compared by the corresponding comparing means, means for counting the number of lanes of each family traversed by the mobile receiving equipment, means operated automatically in response to a third of the reference signals and to a third of the heterodyne signals in the event of inoperation of said system for driving said counting means as soon as the inoperation no longer exists through a number of counts corresponding to the number of lanes of the first family traversed by said mobile receiving equipment during the period of inoperation, and means similar to the last named means but responsive to a fourth of the reference signals and to a fourth of the heterodyne signals as soon as the inoperation no longer exists for driving the counting means of the second indicating means through a number of counts corresponding to the number of lanes of the second family traversed by the mobile receiving equipment during the period of inoperation.

23. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from each station, said receiving equipment also receiving first and second reference signals derived from heterodyning the waves of the first group and third and fourth reference signals derived from heterodyning the waves of the second group with said four reference signals appearing as modulation components upon waves received by said receiving equipment; said equipment comprising first circuit means for reproducing said first and second reference signals and for heterodyning the waves of the first group in pairs to develop first and second heterodyne signals; second circuit means for reproducing said third and fourth reference signals and for heterodyning the waves of the second group in pairs to develop third and fourth heterodyne signals; first indicating means for comparing the phases of the first reference signal and the third heterodyne signal to provide a first position indication representing the location of the mobile receiving equipment relative to a first pair of the transmitting stations; second indicating means for comparing the phase relationship between the second reference signal and the fourth heterodyne signal to provide a second position indication representing the location of the mobile receiving equipment relative to a second pair of the transmitting stations; each of said indicating means including a phase discriminator responsive to the compared signals for developing a motor drive signal, servo motor means energized by the motor drive signal, a control transformer having a rotor driven by said motor means and a stator winding excited by one of the signals to be compared with said rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, each of said indicating means further including a circuit for determining that counts have been lost by said counter mechanism as a result of lanes traversed by the mobile receiving equipment during any periods of system inoperation, the lost lane determining circuit of each indicating means including a resolver having a rotor driven from the rotor of the control transformer of that indicating means through gearing having a ratio substantially equal to the ratio between the mean frequencies of the two groups of waves, the lost lane determining circuit of the first indicating means further including a phase comparison circuit for comparing the phases of said third reference signal and said first heterodyne signal with one of the two last named signals being supplied to a stator winding of the resolver in the first indicating means and with the signal induced in the rotor winding of the latter resolver being supplied to said phase comparison circuit, the lost lane determining circuit of the second indicating means also including a phase comparison circuit for comparing the phases of said fourth reference signal and said second heterodyne signal with one of the two last named signals being supplied to a stator winding of the resolver of the second indicating means and with the signal induced in the rotor winding of the latter resolver being supplied to the phase comparison circuit of the second indicating means, each of said phase comparison circuits being effective to develop a unidirectional control signal having a polarity which is a function of the direction of any deviation in phase between the two signals compared thereby, and means responsive to said control signal for determining the direction of any deviation of each counter mechanism as a result of the lost lanes.

24. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals, for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including an indicator for providing the position indication and a counter mechanism driven by said indicator for registering the lanes traversed by the mobile receiving equipment, each of said indicating means further including an indicating circuit for determining that lanes have been traversed by the mobile receiving equipment during any periods of system inoperation, the indicating circuit of each indicating means including a resolver having a rotor driven with the indicator of that indicating means through gearing having a ratio substantially equal to the ratio between the mean frequencies of the two groups of waves, the indicating circuit of the first indicating means further including a phase comparison circuit for comparing the phases of said third reference signal and said third heterodyne signal with one of the two last named signals being supplied to a stator winding of the resolver in the first indicating means and with the signal induced in the rotor winding of the latter resolver being supplied to said phase comparison circuit, the indicating circuit of the second indicating means also including a phase comparison circuit for comparing the phases of said fourth reference signal and said fourth heterodyne signal with one of the two last named signals being supplied to a stator winding of the resolver of the second indicating means and with the signal induced in the rotor winding of the latter resolver being supplied to the phase comparison circuit of the second indicating means, and means responsive to the outputs from the phase comparison circuits for determining that lanes have been lost by either of the counter mechanisms during any period of inoperation.

25. The apparatus defined by claim 24 wherein the determining means includes means for ascertaining the direction of deviation of each counting means from the correct lane count as a result of any lanes traversed during the period of inoperation.

26. Mobile receiving equipment for use in hyperbolic, continuous wave, radio position finding systems to provide position indications in response to first and second groups of waves received from at least three spaced apart transmitting stations with each group containing at least three waves of slightly different frequency and with one wave in each group being radiated from said station and also in response to modulation components appearing upon at least one carrier wave with the modulation components being derived by heterodyning in pairs the waves of each group; said equipment comprising receiving means for reproducing said modulation components to develop first, second, third and fourth reference signals, for heterodyning the waves of the first group in pairs to develop first and second heterodyne signals and for heterodyning the waves of the second group in pairs to develop third and fourth heterodyne signals; first indicating means for comparing the phases of the first reference signal and the first heterodyne signal to provide a first position indication representing the location of the mobile receiving equipment relative to a first pair of the transmitting stations; second indicating means for comparing the phase relationship between the second reference signal and the second heterodyne signal to provide a second position indication representing the location of the mobile receiving equipment relative to a second pair of the transmitting stations; each of said indicating means including a phase discriminator responsive to the compared signals for developing a motor drive signal in response to deviation in phase between the compared signals, motor means driven by said motor drive signal, a control transformer having a rotor driven by said motor means and a stator winding excited by one of the signals to be compared with the rotor having a winding thereon for supplying to the phase discriminator signals induced therein from the stator winding, an indicator driven from said rotor for providing the position indication, and a counter mechanism driven by said indicator for registering the lanes traversed by the mobile receiving equipment, each of said indicating means further including a circuit for indicating that lanes have been traversed by the mobile receiving equipment during any periods of system inoperation, the indicating circuit of each indicating means including a circuit for comparing the phases of said third reference signal and said third heterodyne signal to develop a first control signal and the indicating circuit of the second indicating means including a circuit for comparing the phases of said fourth reference signal and said fourth heterodyne signal to develop a second control signal, and means responsive to the outputs from the phase comparison circuits for determining that lanes have been lost by either of the counter mechanisms during any period of inoperation.

27. The apparatus defined by claim 26 wherein the determining means includes means for ascertaining the direction of deviation of each counting means from the correct lane count as a result of any lanes traversed during the period of inoperation.

28. Mobile receiving equipment for use in a hyperbolic, continuous wave, radio position finding system for providing a position indication in response to signals received from at least two spaced apart transmitting stations, said equipment comprising means including an indicator movable repeatedly through a predetermined range of movement for providing a position indication representing the location of said mobile receiving equipment along one hyperbolic, isophase line of a family of such lines all having foci at said stations, said family of lines being divided into a plurality of lanes with each lane being represented by one movement of the indicator through said predetermined range, means driven in synchronism with said indicator for counting the number of repeated movements of said indicator through said range in order to count the number of lanes traversed by the mobile receiving equipment, and means operated automatically in the event of inoperation of said transmitting stations or said receiving equipment for automatically determining that lanes have been lost by said counting means during any such period of inoperation as soon as the inoperation no longer exists.

29. The apparatus defined by claim 28 wherein the determining means includes means for ascertaining the direction of deviation of said counting means from the correct lane count as a result of any lanes traversed during the period of inoperation.

30. Mobile receiving equipment for use in a hyperbolic, continuous wave, radio position finding system for providing a position indication in response to signals received from at least two spaced apart transmitting stations, said equipment comprising means for comparing the phase relationship between the received signals to provide a position indication representing the location of said mobile receiving equipment along one hyperbolic, isophase line of a family of such lines all having foci at said stations, said family of lines being divided into a plurality of lanes with each lane being represented by a 360° change in the phase relationship between the signals compared by the comparing means, means driven in synchronism with said comparing means for counting the number of lanes traversed by the mobile receiving equipment, and means operated automatically in the event of inoperation of said transmitting stations or said receiving equipment for automatically determining that lanes have been lost by said counting means during any such period of inoperation as soon as the inoperation no longer exists.

31. The apparatus defined by claim 30 wherein the determining means includes means for ascertaining the direction of deviation of said counting means from the correct lane count as a result of any lanes traversed during the period of inoperation.

32. Equipment for use in a transmitting and receiving system of the hyperbolic, continuous wave, radio position finding system to provide an indication of the position of a mobile craft, said equipment comprising means for comparing the phase relationship between signals received from the transmitting portion of the system to provide a position indication representing the location of said mobile craft along one hyperbolic, isophase line of a family of such lines all having common foci, said family of lines being divided into a plurality of lanes with each lane being represented by a 360° change in the phase relationship between the signals compared by the comparing means, means driven in synchronism with said comparing means for counting the number of lanes traversed by the mobile craft, and means operated automatically in the event of inoperation of said transmitting stations or said receiving equipment for automatically determining that lanes have been lost by said counting means during any such period of inoperation.

33. The apparatus defined by claim 32 wherein the determining means includes means for ascertaining the direction of deviation of said counting means from the correct lane count as a result of any lanes traversed during the period of inoperation.

34. Equipment for use in a hyperbolic, continuous wave, radio position finding system to provide an indication of the position of a mobile craft, said equipment comprising means including an indicator movable repeatedly through a predetermined range of movement for providing a position indication representing the location of said mobile craft along one hyperbolic, isophase line of a family of such lines all having common foci, said family of lines being divided into a plurality of lanes with each lane being represented by one movement of the indicator through said predetermined range, means driven in synchronism with said indicator for counting the number of repeated movements of said indicator through said range in order to count the number of lanes traversed by the mobile craft, and means operated automatically in the event of temporary inoperation in said system for automatically determining that lanes have been lost by said counting means during any such period of inoperation.

35. The apparatus defined by claim 34 wherein the determining means includes means for ascertaining the direction of deviation of said counting means from the correct lane count as a result of any lanes traversed during the period of inoperation.

36. A hyperbolic, continuous wave, radio position finding system comprising first and second transmitting stations for radiating first and second pairs of signals with one signal of each pair being radiated from each station, means in said system for heterodyning the signals of each pair to develop first and second difference signals and for transmitting first and second reference signals respectively derived from the first and second difference signals as modulation components upon at least one carrier wave, and mobile receiving equipment including means for reproducing said first and second reference signals and for heterodyning each pair of signals to develop first and second heterodyne signals, means in the receiving equipment for comparing the phase relationship between the first reference signal and the first heterodyne signal to provide a position indication representing the location of said mobile receiving equipment along one hyperbolic, isophase line of a family of such lines all having foci at said transmitting stations, said family of lines being divided into a plurality of lanes with each lane being represented by a 360° change in the phase relationship between the signals compared by the comparing means, means for counting the number of lanes of said family traversed by the mobile receiving equipment, and means operated automatically in response to said second reference signal and said second heterodyne signal in the event of temporary inoperation in the system for automatically determining that lanes have been lost by said counting means during any period of inoperation.

37. The apparatus defined by claim 36 wherein the determining means includes means for ascertaining the direction of deviation of said counting means from the correct lane count as a result of any lanes traversed during the period of inoperation.

38. A hyperbolic, continuous wave, radio position finding system comprising at least three spaced apart transmitting stations for radiating first and second groups of signals with one signal of each group being radiated from each station, means in said system for heterodyning in pairs the signals of each group to develop four difference signals and for transmitting four reference signals respectively derived from the four difference signals as modulation components upon at least one carrier wave, and mobile receiving equipment including means for reproducing said four reference signals and for heterodyning in pairs each group of signals to develop four heterodyne signals, first indicating means responsive to a first of the reference signals and a first of the heterodyne signals and including an indicator movable repeatedly through a predetermined range of movement for providing a first position indication representing the location of said mobile receiving equipment along one hyperbolic, isophase line of a first family of such lines all having foci at a first pair of said transmitting stations, second indicating means responsive to a second of the reference signals and to a second of the heterodyne signals and also including an indicator movable repeatedly through a predetermined range of movement for providing a second position indication representing the location of the mobile receiving equipment along a hyperbolic, isophase line of a second family of lines having foci at a second pair of said transmitting stations, each of said families being divided into a plurality of lanes with each lane being represented by one movement of the corresponding indicator through its predetermined range, means driven in synchronism with each indicator for counting the number of repeated movements thereof through its range in order to count the number of lanes of each family traversed by the mobile receiving equipment, means operated automatically in response to a third of the reference signals and to a third of the heterodyne signals in the event of inoperation of said system for automatically determining that lanes have been lost by either of said counting means during any such period of inoperation.

39. The apparatus defined by claim 38 wherein the determining means includes means for ascertaining the direction of deviation of each counting means from the correct lane count as a result of any lanes traversed during the period of inoperation.

40. A hyperbolic, continuous wave, radio position finding system comprising at least three spaced apart transmitting stations for radiating first and second groups of signals with one signal of each group being radiated from each station, means in said system for heterodyning in pairs the signals of each group to develop four difference signals and for transmitting four reference signals respectively derived from the four difference signals as modulation components upon at least one carrier wave, and mobile receiving equipment including means for reproducing said four reference signals and for heterodyning in pairs the signals of each group to develop four heterodyne signals, first indicating means responsive to the phase relationship between a first of the reference signals and to a first of the heterodyne signals to provide a first position indication representing the location of said mobile receiving equipment along one hyperbolic, isophase line of a first family of such lines all having foci at said transmitting stations, second indicating means responsive to the phase relationship between a second of the heterodyne signals and a second of the reference signals to provide a second position indication representing the location of the mobile receiving equipment along a hyperbolic, isophase line of a second family of lines having foci at a second pair of the transmitting stations, each of said families being divided into a plurality of lanes with each lane being represented by a 360° change in the phase relationship between the signals compared by the corresponding comparing means, means for counting the number of lanes of each family traversed by the mobile receiving equipment, means operated automatically in response to a third of the reference signals and to a third of the heterodyne signals in the event of inoperation of said system for automatically determining that lanes have been lost by either of said counting means during any such period of inoperation.

41. The apparatus defined by claim 40 wherein the determining means includes means for ascertaining the direction of deviation of each counting means from the correct lane count as a result of any lanes traversed during the period of inoperation.

No references cited.

UNITED STATES PATENT OFFICE
CERTIFICATE OF CORRECTION

Patent No. 3,027,555                                March 27, 1962

James E. Hawkins et al.

It is hereby certified that error appears in the above numbered patent requiring correction and that the said Letters Patent should read as corrected below.

Column 17, line 19, after "servo" insert -- motor --; column 19, line 5, for "saving" read -- having --; same column 19, line 55, and column 20, line 25, for "in operation", each occurrence, read -- inoperation --; column 22, line 9, for "heterodyn" read -- heterodyne --; line 33, for "in operation" read -- inoperation --.

Signed and sealed this 10th day of July 1962.

(SEAL)
Attest:

ERNEST W. SWIDER                                DAVID L. LADD
Attesting Officer                                  Commissioner of Patents